United States Patent
Turlikov et al.

(10) Patent No.: US 9,307,247 B2
(45) Date of Patent: Apr. 5, 2016

(54) COMPRESSION USING RANGE CODING WITH VIRTUAL SLIDING WINDOW

(75) Inventors: Andrey Turlikov, Saint-Petersburg (RU); Anton Sergeev, Saint-Petersburg (RU); Anton Veselov, Saint-Petersburg (RU)

(73) Assignee: Intel Corporation, Santa Clara, CA (US)

(*) Notice: Subject to any disclaimer, the term of this patent is extended or adjusted under 35 U.S.C. 154(b) by 486 days.

(21) Appl. No.: 13/512,927

(22) PCT Filed: Dec. 1, 2009

(86) PCT No.: PCT/RU2009/000658
§ 371 (c)(1),
(2), (4) Date: May 31, 2012

(87) PCT Pub. No.: WO2011/068428
PCT Pub. Date: Jun. 9, 2011

(65) Prior Publication Data
US 2012/0243605 A1    Sep. 27, 2012

(51) Int. Cl.
| | |
|---|---|
| H04N 7/12 | (2006.01) |
| H04N 19/13 | (2014.01) |
| H04N 19/91 | (2014.01) |
| H04N 19/169 | (2014.01) |
| H04N 19/63 | (2014.01) |
| H04N 19/61 | (2014.01) |

(52) U.S. Cl.
CPC .......... *H04N 19/13* (2014.11); *H04N 19/1883* (2014.11); *H04N 19/91* (2014.11); *H04N 19/61* (2014.11); *H04N 19/63* (2014.11)

(58) Field of Classification Search
USPC ...................................... 375/240.03
See application file for complete search history.

(56) References Cited

U.S. PATENT DOCUMENTS

| | | | |
|---|---|---|---|
| 5,859,604 A * | 1/1999 | Slattery et al. | 341/107 |
| 6,212,232 B1 * | 4/2001 | Reed et al. | 375/240.03 |
| 7,236,633 B1 * | 6/2007 | Lewis et al. | 382/233 |
| 7,352,903 B2 | 4/2008 | Withers et al. | |
| 2005/0253740 A1 * | 11/2005 | Marpe et al. | 341/50 |
| 2006/0053004 A1 | 3/2006 | Ceperkovic | |
| 2007/0154106 A1 | 7/2007 | Koziarz | |
| 2007/0217699 A1 * | 9/2007 | Mahiar et al. | 382/232 |

FOREIGN PATENT DOCUMENTS

| | | |
|---|---|---|
| CN | 1564580 | 1/2005 |
| KR | 2008-0022878 | 3/2008 |
| RU | 2339997 | 11/2008 |

OTHER PUBLICATIONS

Belyaev, E., et al., "Binary Arithmetic Coding System with Adaptive Probability Estimation by Virtual Sliding Window," 2006 IEEE 10th International Symposium, Jun. 28, 2006, pp. 1-5.

(Continued)

*Primary Examiner* — Tracy Li
(74) *Attorney, Agent, or Firm* — Trop Pruner & Hu, P.C.

(57) ABSTRACT

Information to be transmitted may be compressed using range coding for adaptive arithmetic coding with a virtual sliding window. Cost and complexity of coding may be reduced in some cases.

17 Claims, 2 Drawing Sheets

(56) References Cited

OTHER PUBLICATIONS

Flordal, O., et al. "Accelerating CABAC Encoding for Multi-standard Media with Configurability", 20th International Parallel and Distributed Processing Symposium, Apr. 25, 2006, pp. 1-8.

Rabbani, M., et al., "An overview of the JPEG 2000 still image compression standard," Signal Processing. Image Communication, Elsevier Science Publishers, Amsterdam, NL, vol. 17, No. 1, Jan. 1, 2002, pp. 3-48.

EP Search Report in EP Application No. EP 09 85 1898 dated May 16, 2013, (5 pages).

Paul G. Howard et al., "Practical Implementations of Arithmetic Coding," Brown University Department of Computer Science, Technical Report No. 92-18, Apr. 1992.

Yushin Cho et al., "Hierahical Dynamic Range Coding of Wavelet Subbands for Fast and Efficient Image Decompression," CIRP Technical Report TR-2007-4, Mar. 2007.

\* cited by examiner

COMPRESSION USING RANGE CODING WITH VIRTUAL SLIDING WINDOW

BACKGROUND

This relates to compression of information for electronic transmission.

Coding processes in real-time time video compression and transmission systems are done in a strictly limited period of time. For example, for high definition television 1080 p (1080×1920 60 fps), every frame is encoded during 17 milliseconds. When the next successive frame arrives at the input of compression system, it is immediately processed.

Compression is used in video and image applications such as conferencing, gaming, and entertainment.

An entropy coder is one of the key elements of video compression systems. It is also one of the most computationally complex elements. An entropy coder is a data compression block that assigns codes to symbols so as to match code lengths with the probabilities of the symbols. The problem here is to find a tradeoff between effective compression of input data and minimum complexity costs.

Usually, entropy coding is realized in modern video compression systems using paired Run-Length and Variable-Length Coding or Arithmetic coding (e.g. Tier-1 in JPEG2000). JPEG 2000 Standard Part I, Final Committee Draft vol. 0, 16 Mar. 2000. Arithmetic coding provides a better compression rate, but it is more complex. For example, Tier-1 is the most complex part of JPEG 2000, which consumes more than 50% of total computation power.

DETAILED DESCRIPTION

An entropy coding algorithm may utilize range coding for adaptive arithmetic coding and a virtual sliding window algorithm for estimating input symbol probabilities. This lightweight, adaptive arithmetic coding solution decreases complexity and cost compared to conventional arithmetic coders in some embodiments. At the same time it may be more convenient for hardware implementations and may reduce the size of a finite hardware solution in some cases. The range coder and virtual sliding window may be applied to a Tier-1 coding block (Context Adaptive Arithmetic Coding, so-called MQ-coder) in the JPEG2000 image compression standard, for example.

An adaptive binary arithmetic coder can be viewed as an encoding device that accepts the binary symbols of a source sequence, along with their corresponding probability estimates, and produces a code stream. Adaptability is provided by updating the probability estimate of a symbol based upon its present value and history.

Practical implementations of arithmetic coding are always less efficient than an ideal one. Finite-length registers limit the smallest probability that can be maintained, and computational speed requires approximations, such as replacing multiplies with adds and shifts. Moreover, symbol probabilities are typically chosen from a finite set of allowed values, so the true symbol probabilities must often be approximated.

Figure 1:
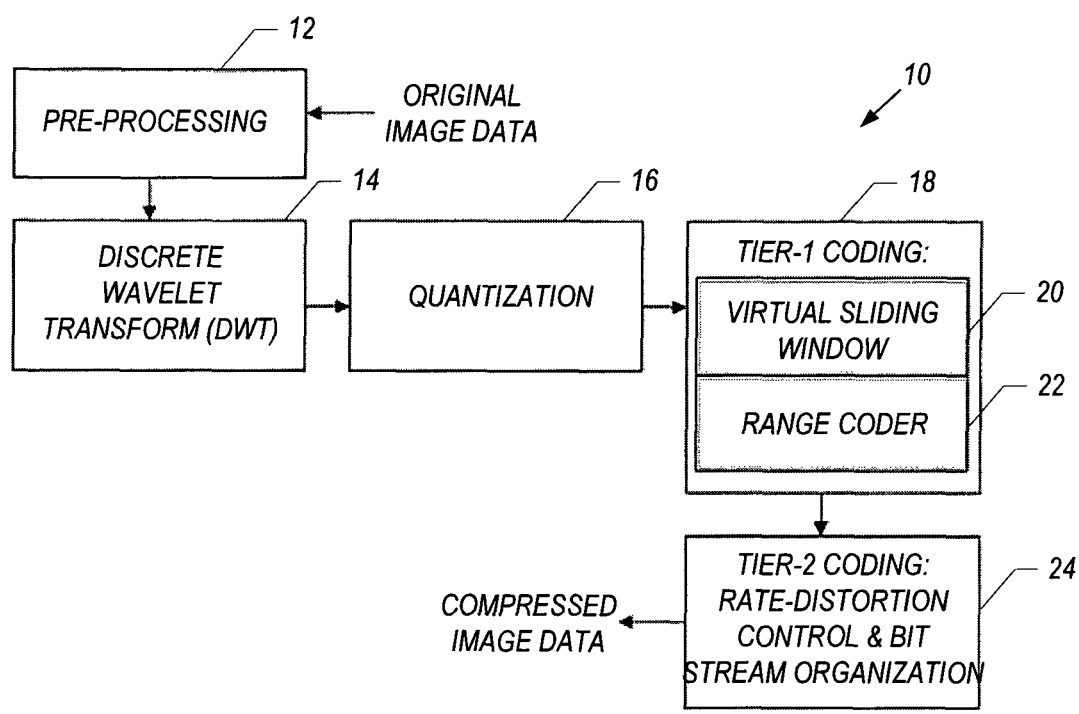
FIG. 1 is a schematic depiction of coding according to one embodiment.

A low-complexity Tier-1 coding using range coder with a virtual sliding window may have better compression results with lower complexity costs than a standard Tier-1 using an MQ-coder in some embodiments. Referring to FIG. 1, the building blocks of an encoder 10 may be divided into two groups: (1) pre-processing 12, discrete wavelet transformation (DWT) 14, quantization 16 and (2) Embedded Block Coding with Optimized Truncation (EBCOT) using bit-plane encoding and context-based adaptive binary arithmetic coder, MQ coder (Tier-1 coding) 18, and rate-distortion optimization and bit stream layer formation (Tier-2 coding) 24.

Tier-1 is the most complex part of JPEG 2000 encoder, consuming more than 50% of total computational power. Therefore, performance of the original standard may be improved by improving arithmetic coding.

To encode the binary bitplanes of the quantizer index, JPEG 2000 uses a context-based adaptive binary arithmetic coder with renormalization-driven probability estimation, known as the MQ-coder. The input to an entropy coder is a sequence of binary symbols and corresponding probabilities.

The probability of a binary symbol is estimated from a context formed and updated according to a finite-state machine every time a symbol is encoded. The mechanism of estimating symbols probability and arithmetic coding form an MQ-coder.

The range coder is one of the most efficient implementations of arithmetic coders. Low-complexity entropy coding may use a range coder 22 and virtual sliding window (VSW) algorithm 20 for probabilities estimation.

The VSW algorithm 20 is an adaptive mechanism for estimating the probability of ones at the output of binary non-stationary sources. The algorithm may be utilized as an alternative adaptation mechanism in a context-based adaptive binary arithmetic codec.

Redundancy in a message can be thought of as consisting of contextual redundancy and alphabetic redundancy. The fact that the letter Q is nearly always followed by the letter U is an example of contextual redundancy. The fact that the letter E is far more common than the letter X is an example of alphabetic redundancy. Range coding is an algorithm for removing both types of redundancy.

If a storage medium has a width of s, or a width of d digits of base b, it can take one of s, or one of $b^d$, different values. If the width is not specified in digits, then absolute numbers are used. If a letter is stored in the storage medium and the medium is restricted to taking one of t different values, then the width of the encoding of the letter is s/t, and the remaining width is t, in which a remainder of width t is stored. The set of t different values that can represent the letter is the range of the letter in the width of storage. For example, if the range of a letter in a byte of storage of width 256 is (n|240≤n<250), then the width of the letter is 25.6, and the remaining width is 10. Anything that could be stored in a decimal digit may be stored as a remainder.

Range encoding conceptually encodes all the symbols of the message into one number, unlike Huffman coding which assigns each symbol a bit-pattern and concatenates all the bit-patterns together. Thus, range encoding can achieve greater compression ratios than the one-bit-per-symbol upper bound on Huffman encoding and it does not suffer the inefficiencies that Huffman encoding does when dealing with probabilities that are not exact powers of two.

One concept in range encoding is that, given a large-enough range of integers, and a probability estimation for the symbols, the initial range can easily be divided into sub-ranges whose sizes are proportional to the probability of the symbol they represent. Each symbol of the message can then be encoded in turn, by reducing the current range down to just that sub-range which corresponds to the next symbol to be encoded. The decoder has the same probability estimation used by the encoder, which can either be sent in advance, derived from already transferred data or be part of the compressor and decompressor, as examples.

When all symbols have been encoded, merely identifying the sub-range is enough to communicate the entire message (presuming of course that the decoder is somehow notified when it has extracted the entire message). A single integer is actually sufficient to identify the sub-range, and it may not even be necessary to transmit the entire integer. If there is a sequence of digits, such that every integer beginning with that prefix falls within the sub-range, then the prefix alone is all that is needed to identify the sub-range and thus transmit the message.

A sliding window algorithm keeps W previous encoded symbols, where W is length of buffer. After encoding of each symbol, the buffer contents are shifted by one position, a new symbol is written to the free cell and the earliest symbol in buffer is erased. This buffer is called "sliding window" after the method of buffer content manipulation.

For binary sources, probability of ones is estimated by Krichevsky-Trofimov formula $$\hat{p}_t = \frac{S_t + 0.5}{W + 1} \quad (1)$$

where $S_t$ is the number of ones in the window at time t. See E. Krichevski, "The Performance of Universal Encoding," IEEE Transactions Inform. Theory, vol. IT-27, pps. 199-207, March 1981.

Suppose a "sliding window" of W cells is given. On input of the next symbol, one cell is chosen at random. The symbol in the chosen cell is replaced by the newly received symbol.

The rule of recalculation in integer implementation can have the following interpretation. Let there be a "sliding window" of cW cells, where c is the algorithm parameter. The value of received symbol is put into c randomly chosen cells and the average number of ones in selected c cells is removed from the window.

Now suppose that the number of ones in the window of cW cells after encoding of next symbol $x_t$ is recalculated by the rule $$S_{t+1} = S_t + \left\lceil \frac{cW - S_t + \frac{W}{2}}{W} \right\rceil, \text{ if } x_t = 1. \quad (2)$$

$$S_{t+1} = S_t - \left\lceil \frac{S_t + \frac{W}{2}}{W} \right\rceil, \text{ if } x_t = 0.$$

Further, we shall call recalculation rule (2) a "virtual sliding window" (VSW). Probability estimation of ones for binary source output for VSW algorithm implementation is defined as $$\hat{p}_t = \frac{S_t}{cW}, \text{ if } x_t = 1. \quad (3)$$

$$\hat{p}_t = 1 - \frac{S_t}{cW}, \text{ if } x_t = 0.$$

If $W=2^i$ is chosen where i is a positive integer, division can be replaced by shift operation.

As a criterion for choice of parameter c we shall take the equality of minimal probability estimation of ones for binary source output for ISW and VSW algorithms. From (1) it follows that the minimal estimated probability for ISW algorithm is $$\hat{p}_{min} = \frac{1}{2(W+1)} \quad (4)$$

From (3) and (4) it follows that the minimal estimated probability for VSW algorithm is $$\hat{p}_{min} = \frac{\frac{W}{2} - 1}{cW} \quad (5)$$

Equating (5) and (6) gives $$\frac{1}{2(W+1)} = \frac{\frac{W}{2} - 1}{cW}$$

$$c = W - 1 - \frac{2}{W} \approx W (\text{if } W \gg 1)$$

Using formula (3) is possible after W symbols entered the window. Therefore, in initial time interval 0<t<W, the probability estimation is calculated by Krichevsky-Trofimov formula as $$\hat{p}_t = \frac{n_t + 0.5}{t + 1} \quad (6)$$

where $n_t$ is the number of ones received in time interval [0,t]. Next, at time moment t=W−1 initialization of ones number in the VSW algorithm is carried out $$S_w = \hat{p}_{w-1} cW = \frac{(n_{w-1} + 0.5)}{W} cW = Wn_{w-1} + \frac{W}{2}$$

where $\hat{p}_{w-1}$ is the probability estimation obtained by formula (6) at time t=W−1. At time instants t≥W probability estimation is calculated by formula (3).

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The present invention may be applicable to a wide range of compression standards in addition to the MQ-coder in JPEG 2000 compressors. As another example, it may be applied to context-adaptive binary arithmetic coding (CABAC) in the H.264 Advanced Video Coding (AVC) ISO 14496 3/09 available from ITU, Geneva, Switzerland, standard compressors. It is also applicable as a low complexity video codec for wireless display for real time wireless video transmission.

Figure 2:
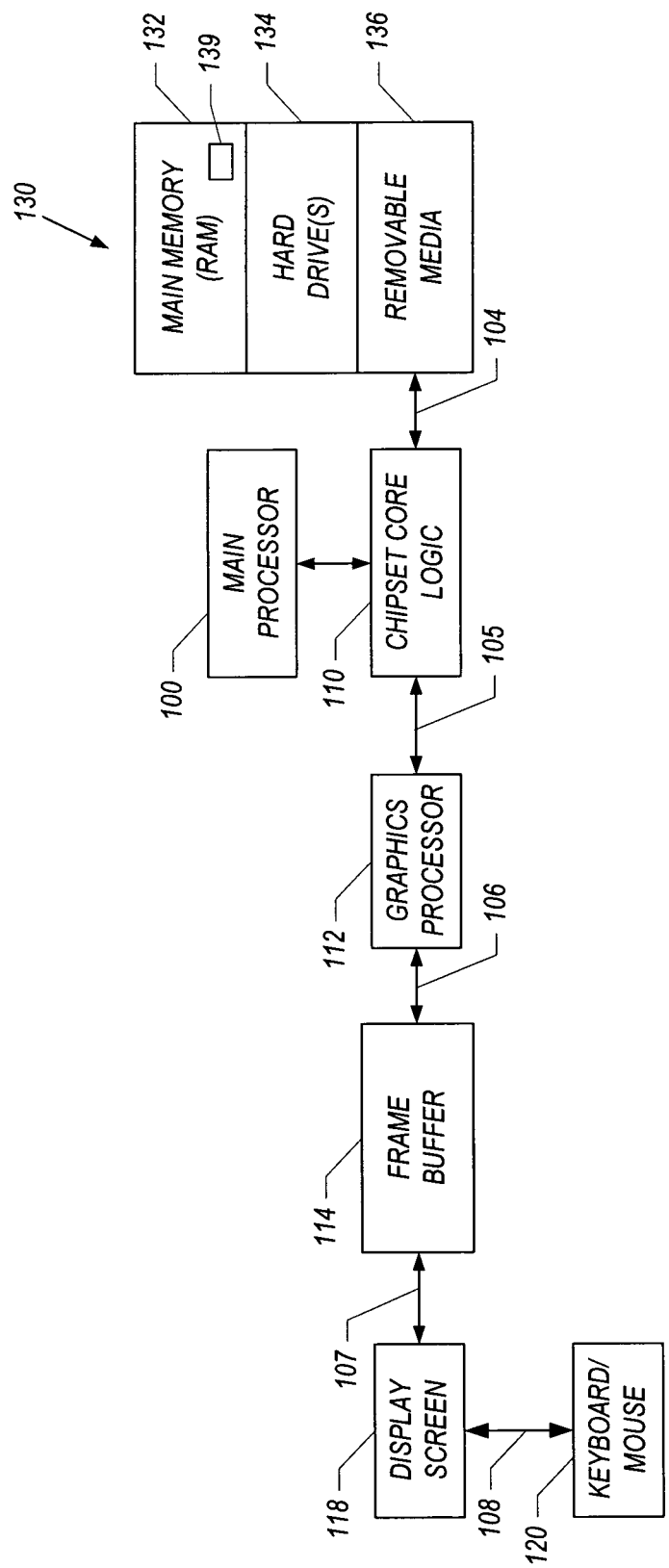
FIG. 2 is a schematic depiction of a processor-based system according to one embodiment.

A computer system 130, shown in FIG. 2, may include a hard drive 134 and a removable medium 136, coupled by a bus 104 to a chipset core logic 110. The core logic may couple to the graphics processor 112 (via bus 105) and the main or host processor 100 in one embodiment. The graphics processor 112 may also be coupled by a bus 106 to a frame buffer 114. The frame buffer 114 may be coupled by a bus 107 to a display screen 118, in turn coupled to conventional components by a bus 108, such as a keyboard or mouse 120.

In the case of a software implementation, the pertinent code may be stored in any suitable semiconductor, magnetic or optical memory, including the main memory 132. Thus, in one embodiment, code 139 may be stored in a machine readable medium, such as main memory 132, for execution by a processor, such as the processor 100 or the graphics processor 112.

In one embodiment, the encoder 10 is part of the graphics processor 112. The sequence, shown in FIG. 1, may be, in one embodiment, software, stored in main memory 132 as indicated at 139. Of course, such software could be resident on the graphics processor 112 or on any other storage device.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A method comprising:
   compressing data using range coding for adaptive arithmetic coding with a virtual sliding window algorithm for estimating input symbol probability by storing previously encoded symbols in a buffer, randomly selecting a cell, replacing a symbol in the chosen cell with a newly received symbol, after encoding the newly received symbol, deleting a previously stored symbol to create a free cell, and storing the newly encoded symbol in said free cell; and
   dividing, using a hardware processor, an initial range into sub-ranges whose sizes are proportional to the probability of the symbol represented by the sub-range.

2. The method of claim 1 including pre-processing the received data before using said range coding with virtual sliding window algorithm.

3. The method of claim 2 including applying discrete wavelet transformation to said pre-processed data before range coding with the virtual sliding window algorithm.

4. The method of claim 3 including quantizing said transformed data before range coding with the virtual sliding window algorithm.

5. The method of claim 4 including applying tier-1 encoding using range coding with a virtual sliding window.

6. The method of claim 5 including using tier-2 coding after tier-1 coding.

7. A non-transitory computer readable medium storing instructions to compress image data using range coding for adaptive arithmetic coding and a virtual sliding window algorithm for estimating input symbol probability by storing previously encoded symbols in a buffer, randomly selecting a cell, replacing a symbol in the chosen cell with a newly received symbol, after encoding the newly received symbol, deleting a previously stored symbol to create a free cell, and storing the newly encoded symbol in said free cell, and to divide an initial range into sub-ranges whose sizes are proportional to the probability of the symbol represented by the sub-range.

8. The medium of claim 7 further storing instructions to preprocess received data before using said range coding with virtual sliding window algorithm.

9. The medium of claim 8 further storing instructions to apply discrete wavelet transformation to said preprocessed data before range coding with the virtual sliding window algorithm.

10. The medium of claim 9 further storing instructions to quantize said transform data before range coding with the virtual sliding window algorithm.

11. The medium of claim 10 further storing instructions to apply tier one encoding using range coding with a virtual sliding window.

12. The medium of claim 11 further storing instructions to use tier two coding after tier one coding.

13. An encoder comprising:
   a quantization device; and
   an MQ-coder coupled to said quantization device, said MQ-coder including a range coder for adaptive arithmetic coding with a virtual sliding window algorithm to estimate input symbol probability by storing previously encoded symbols in a buffer, randomly selecting a cell, replacing a symbol in the chosen cell with a newly received symbol, after encoding the newly received symbol, deleting a previously stored symbol to create a free cell, and storing the newly encoded symbol in said free cell, and to divide an initial range into sub-ranges whose sizes are proportional to the probability of the symbol represented by the sub-range.

14. The encoder of claim 13 including a tier two coder coupled to said MQ-coder.

15. The encoder of claim 13 further including a discrete wavelet transform unit coupled to said quantization unit.

16. The encoder of claim 13 further including a preprocessor to preprocess received data before range coding with the virtual sliding window algorithm.

17. The encoder of claim 14 wherein said tier two coder includes a rate distortion control and bit stream organization unit.

* * * * *